United States Patent [19]
Watts

[11] 3,891,587
[45] June 24, 1975

[54] SYNERGISTIC ANTIBLOCK SYSTEMS FOR AN ETHYLENE/VINYL ACETATE COPOLYMER
[75] Inventor: William A. Watts, Akron, Ohio
[73] Assignee: The Goodyear Tire & Rubber Company, Akron, Ohio
[22] Filed: Apr. 29, 1974
[21] Appl. No.: 465,391

[52] U.S. Cl. ...... 260/28.5 AV; 260/23 R; 260/23 H
[51] Int. Cl. ............................................. C08c 11/70
[58] Field of Search ......... 260/28.5 AV, 23 R, 23 H

[56] References Cited
UNITED STATES PATENTS
| | | | |
|---|---|---|---|
| 3,470,122 | 9/1969 | Ridgeway et al. | 260/28.5 AV |
| 3,474,058 | 10/1969 | Ridgeway et al. | 260/28.5 AV |
| 3,652,474 | 3/1972 | Berry et al. | 260/28.5 AV |

*Primary Examiner*—Melvyn I. Marquis
*Attorney, Agent, or Firm*—F. W. Brunner; H. C. Young, Jr.

[57] ABSTRACT

A thermoplastic composition which comprises an ethylene/vinyl acetate copolymer admixture, a small amount of modifier selected from specific combinations of stearamide, behenamide, stearic acid and paraffin wax. Said composition is particularly suitable in the form of a packaging film having an antiblocking property provided by the synergistic effect of the special combinations of modifiers.

4 Claims, No Drawings

SYNERGISTIC ANTIBLOCK SYSTEMS FOR AN ETHYLENE/VINYL ACETATE COPOLYMER

This invention relates to an ethylene/vinyl acetate copolymer composition. More particularly, the invention relates to an ethylene/vinyl acetate copolymer synergistically compounded to provide anti-blocking characteristics.

Many films of polyolefins tend to block, or lightly stick together, when stacked or rolled against themselves. This blocking or sticking phenomenon can result in a tolerable nuisance or can amount to an intolerable problem. Those having skill in the art are generally continually seeking to substantially reduce or eliminate blocking tendencies of films and sheets of the various thermoplastic films such as the ethylene/vinyl acetate copolymers. Commonly used anti-blocking agents which are compounded with the polyolefins include various waxes, soaps, silicons, pigments, vegetable lecithins and fatty acid amides.

Many thermoplastic films such as ethylene/vinyl acetate copolymers tend to moisture fog as well as block. For a number of applications, it is desired, and indeed required, that they have a minimal tendency to fog. Therefore, simply remedying the blocking problem with the many various compounding recipes does not provide a satisfactory packaging film for many purposes.

Both anti-blocking/anti-fogging properties of a film is necessary if it is used for packaging which contain water or moisture, particularly where such packages are subjected to temperature changes. Poor moisture antifog properties are especially undesirable, for example, in packaging of fresh meat products.

Minimal haze, or maximum visible light transmission, is also a required property for many commercial applications in addition to anti-block and antifog properties.

It has now been discovered that certain combinations of stearamide, behenamide, stearic acid and paraffin wax can produce a synergistic effect with an ethylene/vinyl acetate copolymer to attenuate its tendency to stick to itself, or block, while simultaneously providing a substantially antifogging and low haze film. It has particularly been found that less total compound is required to provide the combination antiblocking and antifogging properties then if the ingredients are used separately.

In accordance with this invention, a thermoplastic composition has been discovered which comprises an ethylene/vinyl acetate copolymer admixture with a small amount of a mixture which comprises stearamide, behenamide, stearic acid and paraffin wax having a softening point of about 45°C to about 55°C according to ASTM E28-58T.

In the practice of this invention, it has been found that a synergistic antiblock effect can be provided for a thermoplastic film of ethylene/vinyl acetate copolymer composition which comprises 100 parts by weight of an ethylene/vinyl acetate copolymer characterized by having a melt index in the range of about 1.2 to about 20 grams/10 minutes according to ASTM No. D 1238 resulting from the reaction of about 72 to about 80 parts by weight ethylene and, correspondingly, about 28 to about 20 parts by weight vinyl acetate wherein said thermoplastic composition contains about 0.15 to about 3 total parts by weight of about 0.02 to about 1 part by weight of individual modifiers selected from combinations of (1) stearamide and behenamide, (2) stearamide, behenamide and stearic acid, (3) stearamide, stearic acid and paraffin wax, (4) behenamide, stearic acid and paraffin wax and (5) stearamide, behenamide, stearic acid and paraffin wax, where said paraffin wax is characterized by having a softening point of about 45°C to about 55°C.

Thus, for example, the individual amount of each modifier, if used, can be summarized as follows:

| Modifier | Parts by weight per 100 parts copolymer |
|---|---|
| Stearamide | .02–1 |
| Behenamide | .02–1 |
| Stearic acid | .02–1 |
| Paraffin Wax | .02–1 |

The thermoplastic composition of this invention is typically in the form of a film having a thickness of about 0.2 to about 10 mils and characterized by having an antiblock property according to antiblock test No. 1, hereinafter described, of about 2 to about 30 grams, an antifog property of about 0 to about 0.5 minute at about 60°C and a percent haze according to ASTM No. D 1003 of about 0 to about 10.

The preparation of various ethylene/vinyl acetate copolymers is well known. For example, such copolymers can be prepared by polymerizing ethylene and vinyl acetate with various catalysts such as non-metallic catalysts, metal oxide catalysts and metal alkyl-reducible metal halide catalysts. Representative of such catalysts include molecular oxygen, various peroxides, azo-bisisobutyronitrile, chromium oxide containing hexavalient chromium, alumina, thoria, zirconia, as well as the well-known organic metallic, particularly organoaluminum and organoaluminum halide Zeigler type catalysts. Typically, the ethylene and vinyl acetate monomers are polymerized at various temperatures in the range of about −100°C to about 260°C at pressures in the range of about 50 to about 50,000 pounds per square inch at residence times in the range of about 1 minute to about 4 hours, depending substantially upon the position of these reaction condition variables as well as the catalyst system. Further, depending on such variables, the polymerization reaction can be conducted in a solvent or in the absence of solvents and thus in the liquid or gaseous phase. By varying the catalyst system as well as the polymerization temperature time and pressure, the molecular weight, as evidenced by its melt index and density, of the thermoplastic copolymer can be controlled.

In the practice of this invention, the ethylene/vinyl acetate copolymer composition can be prepared by dissolving the required modifiers in an organic solvent at a temperature in the range of about 40°C to about 70°C followed by mixing therewith, the ethylene/vinyl acetate copolymer. The mixture is then dried by evaporating the organic solvent to yield the required composition. Typically, the mixture can be dried at a temperature of about 40°C to about 150°C depending primarily upon the organic solvent used. It should be readily understood that if the composition is to be dried as a film, substantially reduced temperatures and times can be used such as temperature in the range of about 70°C to about 90°C for a period of about 15 to about 60 minutes.

The practice of this invention is further illustrated by reference to the following example which is intended to be representative rather than restrictive of the scope of the invention. Unless otherwise indicated, all parts and percentages are by weight.

EXAMPLE I

A series of films was prepared by dispersing and dissolving an ethylene/vinyl acetate copolymer and modifying materials in benzene at about 50°C to about 56°C using a low-speed, laboratory air stirrer and then casting the solutions on glass plates. The cast polymer solution was partially dried on the plates in a plate oven at about 50°C. The partially dried films were then completely dried in a dynamic air oven at 78°C for about 40 minutes to provide a tough transparent film having a thickness of about 1 mil.

Various combinations of modifying materials for the ethylene/vinyl acetate copolymer were used in preparing the various solutions in films which are identified herein as Formulations 1–9 of which Formulations 1–4 are controls.

In particular, the actual Formulations 1–9 are more clearly represented in the following Table 1 which relates the formulations with various mixtures of the ethylene/vinyl acetate copolymer and mixtures of modifiers.

In this example, the antiblock test No. 1 involves placing two film samples together so that a 2 inch × 2 inch 2-ply specimen is obtained. This specimen is placed between two metal plates in a horizontal position and a 200 gram weight is placed on top of the upper plate. The resulting assembly is placed in a dynamic hot air oven at 50°C for 24 hours. At the end of this period, the film is tested for blocking (sticking or adhesion) resistance by measuring the force in grams to separate the films by attempting to pull them apart at about 90° angle and at a rate of about 2 inches per minute.

The block test No. 2 is accomplished by first placing two film samples together so that a 5 inch × 5 inch 2-ply specimen is obtained. This specimen is placed between two metal plates in a position and a 0.5 pounds per square inch pressure is exerted evenly over the entire plate. The assembly is placed in a dynamic hot air oven at 50°C for 24 hours and then tested for block (sticking or adhesion) resistance.

The antifog test is conducted by taut extension of the film over a beaker of hot water (60°C), allowing about one inch of head space above the water. The time required for the moisture to be dispersed evenly over the film as a clear filament is recorded.

TABLE 1

| Formulation* | 1 | 2 | 3 | 4 | 5 | 6 | 7 | 8 | 9 |
|---|---|---|---|---|---|---|---|---|---|
| Film Polymer | 100 | 100 | 100 | 100 | 100 | 100 | 100 | 100 | 100 |
| Stearamide | 0.3 | — | — | — | .12 | .14 | .05 | — | .05 |
| Behenamide | — | 0.3 | — | — | .12 | .08 | — | .05 | .05 |
| Stearic Acid | — | — | 0.3 | — | — | .1 | .1 | .1 | .07 |
| Paraffin Wax | — | — | — | 0.3 | — | — | .1 | .1 | .07 |

*Formulations 1, 2, 3, and 4 are controls using individual modifying compounds

Films of each of the Formulations 1–9 were submitted to two antiblock tests and one moisture antifog test. The antiblock tests No. 1 and No. 2 are a measure of the force in gram required to separate films from another test film and the antifog test is expressed as the time required to disperse condensed water vapor on the film. Results of these antiblock and antifog tests of films prepared according to Formulations 1–9 are more clearly shown in Table 2.

As particularly demonstrated by this example, it has been discovered that only particular types of combinations of the modifying agents co-act to surprisingly provide a film having the required combination of antiblock and antifog properties as well as a clear film with little haze. Indeed, it was found that, for an optimum balance of properties, a combination of all four modifying agents is desirable. The example further illustrates a more preferred range of individual amounts of modi-

TABLE 2*

| Formulations | 1 | 2 | 3 | 4 | 5 | 6 | 7 | 8 | 9 |
|---|---|---|---|---|---|---|---|---|---|
| Block test (1) in grams | T | 640 | T | T | 4.0 | 6.0 | 10.0 | 15.0 | 25. |
| Block test (2) | B | NB | B | B | NB | NB | NB | NB | NB |
| Antifog test in minutes to clear Film | 1.1 | 1.1 | 1.3 | 1.5 | .1 | .1 | .1 | .1 | .1 |
| Appearance | SB | SB | SB | SB | C | C | C | C | C |
| % Haze | 20 | 20 | 25 | 15 | 6.0 | 5.5 | 5.0 | 4.0 | 1.5 |

*B=Block; NB=Non-Blocking; T=Film tore during testing (above about 1000 grams); SB=Surface bloom; C=Clear The results of the tests of Formulations 1–9 as more clearly shown in Table 2 demonstrates that special combinations of selected fatty acid amides, stearic acid and paraffin wax synergisticly provide a composition of an antiblock with antifog property for ethylene/vinyl acetate copolymers while retaining desirable clarity or low haze of films thereof.

fying agents which is about 0.4 to about 0.15 part by weight per 100 parts by weight ethylene/vinyl acetate copolymer, with the overall more preferred desired total amount of modifying agents, or modifiers, being in the range of about 0.2 to about 0.5 part by weight per 100 parts of ethylene/vinyl acetate copolymer. Indeed, it should be particularly pointed out, in accordance with the synergistic effect of this invention, that the total amount of modifiers when used in one of the required combinations, provides a very substantially improved antiblock property when compared to any one of the modifying agents used alone. In the practice of this invention, the fatty acid amides are the stearamide which has the substantial following formula

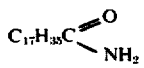

and the behenamide having the following substantial formula

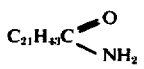

In the practice of this invention, various organic solvents can be used, although the ethylene/vinyl acetate can be mixed with the modifiers without a solvent such as on a mill or by extrusion. Allowable concentration of materials in the solvent is somewhat dependent on the choice of solvent itself. For example, aromatic hydrocarbons, cyclic ethers and dimethyl formamide can be used. Representative of various aromatic hydrocarbons are benzene, toluene, xylene and tetralin and of various cyclic ethers are dioxane and tetrahydrofuran.

While certain representative embodiments and details have been shown for the purpose of illustrating the invention, it will be apparent to those skilled in this art that various changes and modifications may be made therein without departing from the spirit or scope of the invention.

What is claimed is:

1. A thermoplastic composition which comprises 100 parts by weight of an ethylene/vinyl acetate copolymer, characterized by having a melt index in the range of about 1.2 to about 20 grams/ten minutes according to ASTM No. D 1238, resulting from the reaction of about 72 to about 80 parts by weight ethylene and, correspondingly, about 28 to about 20 parts by weight vinyl acetate wherein said thermoplastic composition contains about 0.15 to about 3 total parts of a combination containing about 0.02 to about 1 part by weight of each individual modifier, said combination selected from (1) stearamide and behenamide, (2) stearamide, behenamide and stearic acid, (3) stearamide, stearic acid and paraffin wax, (4) behenamide, stearic acid and paraffin wax and (5) stearamide, behenamide, stearic acid and paraffin wax, where said paraffin wax is characterized by having a softening point of about 45°C to about 55°C.

2. The thermoplastic composition of claim 1 in the form of a film having a thickness of about 0.2 to about 10 mils, an antiblock property according to antiblock test No. 1 of about 2 to about 30 grams, an antifog property of about 0 to about 0.5 minute at about 25°C and a percent haze according to ASTM D 1003 of about 0 to about 10.

3. The thermoplastic composition of claim 2 in the form of said film where the modifier combination is stearamide, behenamide, stearic acid and paraffin wax.

4. The thermoplastic composition according to claim 2 containing about 0.2 to about 0.5 total parts by weight of combinations of about 0.04 to about 0.15 part by weight of each modifier selected from their combinations (1), (2), (3), (4), and (5) per 100 parts by weight of ethylene/vinyl acetate copolymer.

* * * * *